(12) United States Patent
Chino et al.

(10) Patent No.: US 6,465,579 B1
(45) Date of Patent: Oct. 15, 2002

(54) SILICA-POLYMER COMPOSITE, METHOD OF PRODUCTION THEREOF, AND RUBBER COMPOSITION USING THE SAME

(75) Inventors: Keisuke Chino; Fumito Yatsuyanagi; Hidekazu Onoi, all of Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 0 days.

(21) Appl. No.: 09/503,353

(22) Filed: Feb. 14, 2000

(30) Foreign Application Priority Data

Feb. 18, 1999 (JP) ............................. 11-039804
Aug. 31, 1999 (JP) ........................... 11-246268

(51) Int. Cl.$^7$ ................................. C08F 8/00
(52) U.S. Cl. ............... 525/326.5; 525/326.7; 525/326.9; 525/327.3; 525/328.2; 525/328.4; 525/328.5; 525/328.8; 525/329.7; 525/342
(58) Field of Search .................. 525/342, 326.7, 525/326.9, 327.3, 326.5, 328.2, 328.3, 328.4, 328.5, 328.8, 329.7

(56) References Cited

U.S. PATENT DOCUMENTS

| | | |
|---|---|---|
| 3,098,837 A | 7/1963 | Haxo, Jr. |
| 4,481,328 A | 11/1984 | Harreus et al. |

FOREIGN PATENT DOCUMENTS

| | | |
|---|---|---|
| JP | 53-81546 | 7/1978 |
| JP | 64-22940 | 1/1989 |
| JP | 9-151275 | 6/1997 |
| JP | 9-151276 | 6/1997 |
| JP | 10-231381 | 9/1998 |
| JP | 11-286577 | 10/1999 |
| WO | WO96/30444 | 10/1996 |

*Primary Examiner*—Bernard Lipman
(74) *Attorney, Agent, or Firm*—Arent Fox Kintner Plotkin & Kahn

(57) ABSTRACT

A silica-polymer composite, featuring a low viscosity and excellent processability when being kneaded with a rubber and superior in dispersibility and tensile strength, comprising a polymer having a polar group containing a hetero atom and a benzene ring or a polymer having a carboxylic acid reacted with silica in a solution.

13 Claims, No Drawings

SILICA-POLYMER COMPOSITE, METHOD OF PRODUCTION THEREOF, AND RUBBER COMPOSITION USING THE SAME

BACKGROUND OF THE INVENTION

The present invention relates to a silica-polymer composite, more particularly relates to a silica-polymer composite with a low viscosity during mixing with rubber, a good processability, and superior dispersibility. Further, the present invention relates to a rubber composition containing that silica-polymer composite.

A rubber composition comprised of an amino group-containing diene-based rubber and silica is known from Japanese Unexamined Patent Publication (Kokai) No. 64-22940, WP96/30444, Japanese Unexamined Patent Publication (Kokai) No. 9-151275, and Japanese Unexamined Patent Publication (Kokai) No. 9-151276, etc. Further, the method of producing a master batch by coprecipitating a silicate and latex is known from Japanese Patent No. 1146028. Further, the method of producing a rubber-silica reinforced master batch using a silane coupling agent is disclosed in Japanese Unexamined Patent Publication (Kokai) No. 10-231381. Further, U.S. Pat. No. 3,098,837 discloses a composite of butadiene-2-methyl-5 vinyl pyridine copolymer and silica. For the method of synthesis, however, it is indicated that careful control of the pH is required and that control of the drying temperature is also required.

Further, U.S. Pat. No. 4,481,328 discloses a composite of a butadiene-methacrylate copolymer and carbon black.

SUMMARY OF THE INVENTION

An object of the present invention is to provide a silica-polymer composite which coagulates without separation of the silica and polymer by reacting the silica with a specific polymer having a polar ring and benzene ring or a specific polymer having a specific carboxylic acid.

Another object of the present invention is to provide a rubber composition comprised of a blend of this composite and a rubber and having a good processability and superior uniform dispersibility of the silica.

According to a first aspect of the present invention, there is provided a silica-polymer composite obtained by reacting a polymer having a polar group containing a hetero atom and a benzene ring with silica in a solution.

Preferably, the silica is treated with the polymer having the pyridine ring and benzene ring in the molecule in a solution and then treated by another polymer solution.

According to a second aspect of the present invention, there is provided a rubber composition containing such a silica-polymer composite.

Further, according to a third aspect of the present invention, there is provided a method of producing a silica-polymer composite comprising reacting a polymer having a polar group containing a hetero atom and a benzene ring with silica in a solution.

According to a fourth aspect of the present invention, there is provided a silica-polymer composite obtained by reacting a polymer having a carboxylic acid with silica.

According to a fifth aspect of the present invention, there is provided a rubber composition containing such a silica polymer composite.

According to a sixth aspect of the present invention, there is provided a method of producing a silica-polymer composite comprising reacting a polymer having a carboxylic acid with silica.

DETAILED DESCRIPTION

Silica exhibits good viscoelastic characteristics in combination with rubber, but is inferior in dispersibility. It is known to improve the dispersibility of silica using various methods so as to further improve the viscoelastic characteristics. On the other hand, emulsion-polymerized SBR is more advantageous in cost than solution-polymerized SBR and further has the advantage of being superior in dynamic properties. Therefore, the present inventors etc. experimented with using emulsion polymerized SBR to make a master batch, whereupon they discovered that by treating the silica with one of the types of polymers used in the present invention, especially, a vinyl pyridine-containing SBR latex, it was possible to synthesize a composite free from separation of the silica and rubber without control of the pH or control of the drying temperature. This is believed to be due to the aggregation force between benzene rings. Further, the present inventors discovered that it is possible to synthesize a composite free from separation of the silica and rubber even when adding a SBR latex and causing coagulation after adding the vinyl pyridine-containing SBR latex to the silica. Further, since the obtained composite is low in viscosity during kneading with rubber, excellent in processability, and superior in dispersibility as well, it is extremely useful as a master batch for blending of reinforcing silica in rubber compositions.

Further, the inventors discovered that by similarly treating silica by a carboxylic acid-containing latex, it is possible to synthesize a composite without separation of the silica and rubber. Further, they discovered that a surfactant could be used and that colloidal silica could be effectively used as the silica. Further, they discovered that the composite obtained was excellent in processability and superior in dispersibility and a rubber composition containing this was high in tensile strength.

In the present invention, as the polymer having a polar group containing a hetero atom and a benzene group to be reacted with the silica in a solution, typically a diene-based rubber latex having a polar group containing a hetero atom and a benzene ring is used. In the present invention, it is effective if a diene-based rubber latex having a polar group containing a hetero atom and a benzene ring or that diene-based rubber latex having a polar group and a benzene ring and another diene-based rubber latex are used together, since a rubber composition is obtained which has a high degree of balance in the heat buildup, tensile strength, abrasion resistance, processability, and other characteristics.

As he hetero atom, atoms belonging to Group 5B and Group 6B of the second to fourth Periods of the Periodic Table are shown. Specifically, for example, a nitrogen atom, oxygen atom, sulfur atom, phosphorus atom, etc. may be mentioned. Among these, a nitrogen atom, oxygen atom, etc. are preferred.

As he polar group containing such a hetero atom, for example, a hydroxyl group, alkoxysilyl group, epoxy group, carboxyl group, carbonyl group, oxycarbonyl group, sulfide group, disulfide group, sulfonyl group, sulfinyl group, thiocarbonyl group, imino group, amino group, nitrile group, ammonium group, imide group, amide group, hydrazo group, azo group, diazo group, oxygen-containing heterocyclic group, nitrogen-containing heterocyclic group, sulfur-containing heterocyclic group, etc. may be mentioned. Among these, a hydroxyl group, carboxyl group, epoxy group, sulfide group, sulfonyl group, amino group, nitrogen-containing heterocyclic group, alkoxysilyl group, etc. are preferred. A hydroxyl group, amino group, carboxy group, nitrogen-containing heterocyclic group, alkoxysilyl group, etc. are more preferred. A carboxyl group, amino group, nitrogen-containing heterocyclic group, alkoxysilyl group, etc. are most preferred.

As the polymer having a polar group containing a hetero tom and a benzene group, for example, (1) a polar group-containing diene-based rubber, such as a copolymer of a vinyl-based monomer having a polar group containing a hetero atom, a conjugate diene, and an aromatic vinyl compound or (2) a diene-based rubber containing a polar group comprising a copolymer of a conjugate diene and an aromatic vinyl compound, wherein the (co)polymer having an active metal bonded in the molecule is reacted with a modifying agent to introduce a polar group containing a hetero atom into the (co)polymer.

The content of the monomers in the diene-based rubber containing a polar group obtained by copolymerization of (1) as stated above may be suitably selected in accordance with the objective. In the case of a polymer (rubber) of a vinyl-based monomer having a polar group containing a hetero atom, a conjugate diene, and an aromatic vinyl compound, the content of the bonding units:of the polar group-containing vinyl-based monomer is normally 0.01 to 20 wt %, preferably 0.05 to 15 wt %, more preferably 0.1 to 10 wt %, the content of the bonding units of the conjugate diene monomer is normally 40 to 94.99 wt %, preferably 50 to 85 wt %, more preferably 55 to 80%, and the content of the bonding units of the aromatic vinyl monomer is normally 5 to 55 wt %, preferably 10to 45 wt %, more preferably 15 to 40 wt %. Further, when using a copolymer (rubber) latex having such contents of monomer bonding units, a rubber composition is obtained with a high degree of balance of the properties of the heat buildup and the wet skid resistance.

The contents of the monomers in the polar group-containing diene-based rubber into which a polar group containing a hetero atom is introduced by the above method of modification of (2) are suitably selected in accordance with the required properties. The content of the bonding units of the conjugate diene monomer is normally 40 to 100 wt %, preferably 50 to 90 wt %, more preferably 60 to 85 wt %, while the content of the bonding units of the aromatic vinyl monomer is normally 0 to 60 wt %, preferably 10 to 50 wt %, more preferably 15 to 40 wt %.

As the conjugate diene, for example, 1,3-butadiene, 2-methyl-1,3-butadiene, 2,3-dimethyl-1,3-butadiene, 2-chloro-1,3-butadiene, 1,3-pentadiene, isoprene, etc. may be mentioned. Among these, 1,3-butadiene, 2-methyl-1,3-butadiene, isoprene, etc. are preferred. 1.3-butadiene is more preferred. These conjugate dienes may be used alone or in combinations of two or more types.

As the aromatic vinyl monomer, an aromatic vinyl compound not having a polar group is used. For example, styrene, α-methylstyrene, 2-methylstyrene, 3-methylstyrene, 4-methylstyrene, 2,4-diisopropyl-styrene, 2,4-dimethylstyrene, 4-t-butylstyrene, 5-t-butyl-2-methylstyrene, monochlorostyrene, dichlorostyrene, monofluorostyrene, etc. may be mentioned. Among these, styrene is preferred. The aromatic vinyl monomer may be used alone or in combinations of two or more types.

Further, the polar group-containing vinyl-based monomer is not particularly limited so long as it is a polymerizable monomer having at least one polar group in its molecule. Specifically, for example, an amino group-containing vinyl-based monomer, a hydroxyl group-containing vinyl-based monomer, a carboxyl group- containing vinyl-based monomer, an alkoxysilyl group-containing vinyl-based monomer, etc. may be mentioned. Preferably, a carboxyl group-containing vinyl-based monomer, an alkoxysilyl group-containing vinyl-based monomer, an amino group-containing vinyl-based monomer, etc. may be mentioned. These polar group-containing vinyl-based monomers may be used alone or in combinations of two or more types.

As the amino group-containing vinyl-based monomer, a polymerizable monomer having at least one amino group selected from a primary, secondary, and tertiary amino group in its molecule may be mentioned. Among these, a tertiary amino group-containing vinyl-based monomer is particularly preferred. These amino group-containing vinyl-based monomers may be used alone or in combinations of two or more types.

As the primary amino group-containing vinyl-based monomer, for example, acrylamide, methacrylamide, p-aminostyrene, aminomethyl(meth)acrylate, aminoethyl (meth)acrylate, aminopropyl(meth)acrylate, aminobutyl (meth)acrylate, etc. may be mentioned.

As the secondary amino group-containing vinyl-based monomer, for example, the anilinostyrenes disclosed in Japanese Unexamined Patent Publication (Kokai) No. 61-130355; the anilinophenylbutadienes disclosed in Japanese Unexamined Patent Publication (Kokai) No. 61-130356; N-monosubstituted (meth)acrylamides such as N-methyl(meth)acrylamide, N-ethyl(meth)acrylamide, N-methylol acrylamide, N-(4-anilinophenyl) methacrylamide, etc.; etc. may be mentioned.

As the tertiary amino group-containing vinyl-based monomer, for example, N,N-disubstituted aminoalkylacrylate, N,N-disubstituted aminoalkylacrylamide, N,N-disubstituted amino aromatic vinyl compound, and a vinyl compound having a pyridine group may be mentioned.

As the N,N-disubstituted aminoacrylate, for example, N,N-dimethylaminomethyl(meth)acrylate, N,N-dimethylaminoethyl(meth)acrylate, N,N-dimethylaminopropyl(meth)acrylate, N,N-dimethylaminobutyl(meth)acrylate, N,N-diethylaminoethyl (meth)acrylate, N,N-diethylaminopropyl(meth)acrylate, N,N-diethylaminobutyl(meth)acrylate, N-methyl-N-ethylaminoethyl(meth)acrylate, N,N-dipropylaminoethyl (meth)acrylate, N,N-dibutylaminoethyl(meth)acrylate, N,N-dibutylaminopropyl(meth)acrylate, N,N-dibutylaminobutyl (meth)acrylate, N,N-dihexylaminoethyl(meth)acrylate, N,N-dioctylaminoethyl(meth)acrylate, acryloylmorpholine, and other acrylic acid or methacrylic acid esters etc. may be mentioned. Among these, N,N-dimethylaminoethyl(meth) acrylate, N,N-diethylaminoethyl(meth)acrylate, N,N-dipropylaminoethyl(meth)acrylate, N,N-dioctylaminoethyl (meth)acrylate, N-methyl-N-ethylaminoethyl(meth) acrylate, etc. are preferred.

As the N,N-disubstituted aminoalkyl acrylamide, for example, N,N-dimethylaminomethyl(meth)acrylamide, N,N-dimethylaminoethyl(meth)acrylamide, N,N-dimethylaminopropyl(meth)acrylamide, N,N-dimethyloaminobutyl(meth)acrylamide, N,N-diethylaminoethyl(meth)acrylamide, N,N-diethylaminopropyl(meth)acrylamide, N,N-diethylaminobutyl(meth)acrylamide, N-methyl-N-ethylaminoethyl(meth)acrylamide, N,N-dipropylaminoethyl (meth)acrylamide, N,N-dibutylaminoethyl(meth) acrylamide, N,N-dibutylaminopropyl(meth)acrylamide, N,N-dibutylaminobutyl(meth)acrylamide, N,N-dihexylaminoethyl(meth)acrylamide, N,N-dihexylaminopropyl(meth)acrylamide, N,N-dioctylaminopropyl(meth)acrylamide, and other acrylamide compounds or methacrylamide compounds etc. may be mentioned. Among these, N,N-dimethylaminopropyl(meth)acrylamide, N,N-diethylaminopropyl(meth)acrylamide, N,N-dioctylaminopropyl(meth)acrylamide, etc. are preferred.

As the N,N-disubstituted amino aromatic vinyl compound, for example, N,N-dimethylaminoethylstyrene, N,N-diethylaminoethylstyrene, N,N-dipropylaminoethylstyrene, N,N-dioctylaminoethylstyrene, and other styrene derivatives may be mentioned.

Further, instead of an amino group, a nitrogen-containing heterocyclic group is also possible. As such a nitrogen-containing heterocyclic group, for example, pyrrole, histidine, imidazole, triazolidine, triazole, triazine, pyridine, pyrimidine, pyrazine, indole, quinoline, purine, phenazine, pteridine, melamine, etc. may be mentioned. The nitrogen-containing heterocyclic group may contain another heterocyclic group in the ring as well. Further, as a vinyl compound having a pyridyl group, for example, 2-vinylpyridine, 3-vinylpyridine, 4-vinylpyridine, 5-methyl-2-vinylpyridine, 5-ethyl-2-vinylpyridine, etc. may be mentioned. Among these, 2-vinylpyridine, 4-vinylpyridine, etc. are preferred.

As the hydroxyl group-containing vinyl-based monomer, a polymerizable monomer having at least one primary, secondary, or tertiary hydroxyl group in its molecule may be mentioned. As such a hydroxyl group-containing vinyl-based monomer, for example, an unsaturated carboxylic acid-based monomer, vinyl ether-based monomer, vinyl ketone-based monomer, etc. all containing a hydroxyl group may be mentioned. Among these, a hydroxyl group-containing unsaturated carboxylic acid-based monomer is suitable. As a hydroxyl group-containing unsaturated carboxylic acid-based monomer, for example, an acrylic acid, methacrylic acid, itaconic acid, fumaric: acid, maleic acid, or other acid ester, amide, anhydride, or other derivative may be mentioned, in particular an acrylic acid, methacrylic acid, or other acid ester.

Further, as specific examples of the hydroxyl group-containing vinyl-based monomer, for example, hydroxymethyl(meth)acrylate, 2-hydroxyethyl-(meth)acrylate, 2-hydroxypropyl(meth)acrylate, 3-hydroxypropyl(meth)acrylate, 3-chloro-2-hydroxypropyl(meth)acrylate, 3-phenoxy-2-hydroxypropyl(meth)acrylate, glycerolmono-(meth)acrylate, hydroxybutyl(meth)acrylate, 2-chloro-3-hydryoxpropyl(meth)acrylate, hydroxyhexyl(meth)-acrylate, hydroxyoctyl(meth)acrylate, hydroxymethyl(meth)acrylamide, 2-hydroxypropyl(meth)acrylamide, 3-hydroxypropyl(meth)acrylamide, di-(ethyleneglycol)itaconate, di-(propyleneglycol)itaconate, bis(2-hydroxypropyl)itaconate, bis(2-hydroxyethyl)itaconate, bis(2-hydroxyethyl)fumarate, bis(2-hydroxyethyl)-maleate, 2-hydroxyethylvinyl ether, hydroxymethyl-vinylketone, allyl alcohol, etc. may be illustrated. Among these, hydroxymethyl(meth)acrylate, 2-hydroxyethyl(meth)acrylate, 2-hydroxypropyl-(meth)acrylate, 3-hydroxypropyl(meth)acrylate, 3-phenoxy-2-hydroxypropyl(meth)acrylate, glycerolmono(meth)acrylate, hydroxybutyl(meth)acrylate, hydroxyhexyl(meth)acrylate, hydroxyoctyl-(meth)acrylate, hydroxymethyl(meth)acrylamide, 2-hydroxypropyl(meth)acrylamide, 3-hydroxypropyl(meth)acrylamide, etc. are preferred.

As the alkoxysilyl group-containing vinyl-based monomer, for example, the alkoxysilyl group-containing vinyl-based monomers disclosed in Japanese Unexamined Patent Publication (Kokai) No. 7-188356, such as trimethoxyvinylsilane, triethoxyvinylsilane, 6-trimethoxysilyl-1,2-hexene, p-trimethoxysilylstyrene, methacrylate-3-trimethoxysilylpropyl, acrylate-3-triethoxysilylpropyl, etc. may be mentioned.

As the carboxyl group, acrylic acid, methacrylic acid, itaconic acid, fumaric acid, maleic acid, etc. may be mentioned.

As the polymer having a polar group containing a hetero atom and a benzene ring used in the present invention, a polymer having said amino group and benzene ring, preferably a polymer having a pyridine ring and benzene ring in its molecule, particularly preferably rubber latexes of these polymers are suitably used.

As the polymer having a carboxylic acid used in the present invention, for example, polyacrylic acid, an ethylene-vinyl acetate copolymer (including some carboxylic acids), polyamide, epoxy resins, polyester carboxylic acid-containing diene-based rubber, carboxylic acid-containing thermoplastic elastomers, carboxylic acid modified polyethylene, carboxylic acid-modified polypropylene, carboxylic acid-modified SEBS, etc. may be mentioned.

As the polymer having such a carboxylic acid, an elastomer (here, an "elastomer" meaning a polymer having a glass transition point of less than room temperature) is preferred. As such an elastomer, for example, an acryl rubber, ethylene acryl rubber, carboxylic acid-modified polybutadiene, carboxylic acid-modified polyisoprene, carboxylic acid-modified nitrile butadiene rubber, carboxylic acid-modified butyl rubber, carboxylic acid-modified urethane rubber, carboxylic acid-modified silicone rubber, carboxylic acid-modified polysulfide rubber, carboxylic acid-modified fluororubber, carboxylic acid-modified epichlorohydrin rubber, carboxylic acid-modified norbornene rubber, carboxylic acid-modified styrene-based thermoplastic elastomer, carboxylic acid-modified olefin-based thermoplastic elastomer, carboxylic acid-modified urethane-based thermoplastic elastomer, carboxylic acid-modified polyester-based thermoplastic elastomer, carboxylic acid-modified polyamide-based thermoplastic elastomer, carboxylic acid-modified vinyl chloride-based thermoplastic elastomer, carboxylic acid-modified fluorine-based thermoplastic elastomer, etc. may be used.

Further, as the elastomer having a carboxylic acid, a carboxylic acid-containing latex is particularly preferred. As such a latex, for example, a styrene-butadiene-(meth)acrylate copolymer latex, styrene-butadiene-(meth)acrylate-vinylpyridine copolymer latex, carboxylic acid-modified liquid isoprene rubber latex, carboxylic acid-modified isoprene rubber latex, carboxylic acid-modified styrene-butadiene rubber latex, carboxylic acid-modified natural rubber latex, carboxylic acid-modified butadiene rubber latex, carboxylic acid-modified acrylonitrile-butadiene rubber latex, carboxylic acid-modified chloroprene latex, carboxylic acid-modified acryl rubber latex, carboxylic acid-modified acrylate-butadiene rubber latex, carboxylic acid-modified vinyl acetate rubber latex, etc. may be mentioned.

Further, the silica used in the present invention may be, not particularly limited to, a wet or dry silica, colloidal silica, surface-treated silica, etc. Any silica having residual silanol groups may be used.

The silica-polymer composite of the present invention can be obtained by reacting a predetermined polymer having a polar group containing a hetero atom and a benzene ring or a polymer having a carboxylic acid with silica in a solution in a one-step or two-step operation. In the case of a predetermined polymer component having a polar group containing a hetero atom and a benzene ring, the hetero atom-containing polar group unit and, in the case of a polymer having a carboxylic acid, the carboxylic acid unit must be reacted with the silica in an amount of more than 0.1 wt %. If the amount of the polymer component blended is not more than 0.1 wt %, separation ends up occurring and the desired silica-polymer composite cannot be obtained. The reaction time can be shortened along with rising in the reaction temperature. With a reaction at room temperature, a reaction time of at least 1 hour is required. Further, the polymer solution added second is not particularly limited, but an emulsion solution is preferred. Various ones such as SBR, BR, IR, NR, NBR, ABS, acrylate-based, and vinyl chloride-based ones may be used. Further, it is more preferred if an emulsifier, silane coupling agent, various oils, an antioxidant, a filler, plasticizer, softening agent, and other additives are present in the system.

The predetermined silica-polymer composite of the present invention, when kneaded in rubber as a reinforcing silica rubber master batch, can give a rubber composition which is low in viscosity during kneading with rubber, is excellent in processability, and is superior in dispersibility as well. The rubber component to be blended in the rubber composition according to the present invention is a cross-linkable rubber component and may be one component or a mixture of two or more. As the cross-linkable rubber, any rubber may be used. For example, natural rubber (NR), various types of butadiene rubbers (BR), various types of styrene-butadiene copolymer rubbers (SBR), polyisoprene rubber (IR), butyl rubber (IIR), acrylonitrile butadiene rubber, chloroprene rubber, ethylene-propylene copolymer rubber, ethylene-propylene-diene copolymer rubber, styrene-isoprene copolymer rubber, styrene-isoprene-butadiene copolymer rubber, isoprene-butadiene copolymer rubber, chorosulfonated polyethylene, acryl rubber, epichlorohydrin rubber, polysulfide rubber, silicone rubber, fluororubber, urethane rubber, etc. may be used. When using a blend, the blending ratio is not particularly limited.

The rubber composition according to the present invention may have blended in it various additives generally blended for general rubber use, for example, carbon black as a filler and further an ordinary vulcanization or cross linking agent, a vulcanization or cross-linking accelerator, various types of oils, an antioxidant, filler, plasticizer, softening agent, etc. The formulations may be kneaded and vulcanized by general methods to form a composition and used for vulcanization or cross-linking. The amounts of these additives blended may be the amounts generally blended in the past so long as they do not run counter to the objects of the present invention.

Below, the present invention will be explained further using Synthesis Examples, Examples, and Comparative Examples, but the scope of the present invention is of course not limited by these Examples.

EXAMPLES

1) Synthesis of Composite 1

One liter of water was added to 300 g of silica and the mixture was stirred to prepare a dispersion. While stirring, 247 g of a styrene-butadiene-vinyl pyridine copolymer latex (Nipol 2518FS) (100 g worth of rubber) was slowly added dropwise, then the mixture was stirred for 5 hours. After this, 10 g of sodium chloride was added and the mixture was stirred to cause the composite of rubber and silica to precipitate. This composite was sucked up and squeezed dried, then lightly washed with water and again squeezed dried, then dried at 120° C. in vacuo to obtain the composite.

2) Synthesis of Composite 2

One liter of water was added to 300 g of silica and the mixture was stirred to prepare a dispersion. While stirring, 247 g of a styrene-butadiene-vinyl pyridine copolymer latex (Nipol 2518FS) (100 g worth of rubber) was slowly added dropwise, then the mixture was stirred for 5 hours. After this, 806.5 g of styrene-butadiene copolymer latex (Nipol 1502) (200 g worth of rubber) was slowly added dropwise, then the mixture stirred for 5 hours. Next, 10 g of sodium chloride was added and the mixture was stirred to cause the composite of rubber and silica to precipitate. This composite was sucked up and squeezed dried, then lightly washed with water and again squeezed dried, then dried at 120° C. in vacuo to obtain the composite.

3) Synthesis of Composite 3

One liter of water was added to 300 g of silica and the mixture was stirred to prepare a dispersion. While stirring, 20 g of mercapto trimethoxysilane (A-189) was added and the mixture was stirred for 3 hours. Next, 247 g of a styrene-butadiene-vinyl pyridine copolymer latex (Nipol 2518FS) (100 g worth of rubber) was slowly added dropwise, then the mixture was stirred for 5 hours. After this, 806.5 g of styrene-butadiene copolymer latex (Nipol 1502) (200 g worth of rubber) was slowly added dropwide, then the mixture was stirred for 5 hours. Next, 10 g of sodium chloride was added and the mixture was stirred to cause the composite of rubber and silica to precipitate. This composite was sucked up and squeezed dried, then lightly washed with water and again squeezed dried, then dried at 120° C. in vacuo to obtain the composite.

4) Synthesis of Composites 4 to 11

Composites 4 to 11 were synthesized based on the methods of synthesis of the above Composites 1 to 3 in accordance with the ingredients and reaction conditions shown in the following Tables 1A and 1B. The above results are shown in Tables 1A and 1B.

TABLE 1A

| | Synthesis Examples | | | | | |
|---|---|---|---|---|---|---|
| | Composite | | | | | |
| | 1 | 2 | 3 | 4 | 5 | 6 |
| Silica*1 | 300 g | 300 g | 300 g | 300 g | 300 g | 300 g |
| SBVP copolymer latex | 247 g | 247 g | 247 g | 247 g | 247 g | 247 g |
| (amount of rubber)*2 | (100 g) | (100 g) | (100 g) | (100 g) | (100 g) | (100 g) |
| SB copolymer latex | | 806.5 g | 806.5 g | 806.5 g | 806.5 g | 2016 g |
| (amount of rubber)*3 | | (200 g) | (200 g) | (200 g) | (200 g) | (200 g) |
| NBR latex (amount of | | | | | | |

TABLE 1A-continued

Synthesis Examples

| | Composite | | | | | |
|---|---|---|---|---|---|---|
| | 1 | 2 | 3 | 4 | 5 | 6 |
| rubber)*4 | | | | | | |
| Mercaptotrimethoxy-silane*5 | | | 20 g | | | |
| Reaction temperature 1st-step reaction time | Room temp. 5 hours | Room temp. 5 hours | Room temp. 5 hours | Room temp. 5 hours | 80° C. 0.5 hour | Room temp. 5 hours |
| 2nd-step reaction time | | 5 hours | 5 hours | 0.5 hour | 0.5 hour | 5 hours |
| State of composite | Produced | Produced | Produced | Produced | Produced | Produced |

Notes) *1Silica: Nipsil AQ (made by Nihon Silica)
*2Styrene-butadiene-vinyl pyridine copolymer latex: Nipol 2518FS (made by Nippon Zeon)
*3Styrene-butadiene copolymer latex: Nipol 1502 (made by Nippon Zeon)
*4Acrylonitrile-butadiene copolymer latex: Nipol 1561 (made by Nippon Zeon)
*5Mercaptotrimethoxysilane: A-189 (made by Nippon Unicar)

TABLE 1B

Synthesis Examples

| | Composite | | | | |
|---|---|---|---|---|---|
| | 7 | 8 | 9 | 10 | 11 |
| Silica*1 | 300 g | 300 g | 300 g | 300 g | 300 g |
| SBVP copolymer latex (amount of rubber)*2 | 74.1 g (30 g) | 7.41 g (3 g) | 0.741 g (0.3 g) | 0.741 g (0.3 g) | 7.41 g (3 g) |
| SB copolymer latex (amount of rubber)*3 | 2299 g (570 g) | 2407 g (597 g) | 2418 g (599.7 g) | 2418 g (599.7 g) | |
| NBR latex (amount of rubber)*4 | | | | | 1194 g (597 g) |
| Mercaptotrimethoxy-silane*5 | | | 20 g | | |
| Reaction temperature 1st-step reaction time | Room temp. 5 hours | Room temp. 5 hours | Room temp. 5 hours | 80° C. 5 hours | Room temp. 5 hours |
| 2nd-step reaction time | 5 hours | 5 hours | 5 hours | 5 hours | 5 hours |
| State of composite | Produced | Produced | Separated | Separated | Produced |

Notes) *1Silica: Nipsil AQ (made by Nihon Silica)
*2Styrene-butadiene-vinyl pyridine copolymer latex: Nipol 2518FS (made by Nippon Zeon)
*3Styrene-butadiene copolymer latex: Nipol 1502 (made by Nippon Zeon)
*4Acrylonitrile-butadiene copolymer latex: Nipol 1561 (made by Nippon Zeon)
*5Mercaptotrimethoxysilane: A-189 (made by Nippon Unicar)

From the results of Tables 1A and 1B, it is learned that if the amount of the styrene-butadiene-vinyl pyridine copolymer latex is not more than 0.1 wt % based on the silica in terms of rubber (Synthesis Examples 9 and 10), separation ends up occurring from the silica and the composite is not produced. The amount of the styrene-butadiene copolymer latex used for the second reaction, however, is not particularly limited. Further, regarding the reaction time, it was learned that the reaction time can be shortened if the reaction temperature is raised.

5) Synthesis of Composite 16

750 ml of water was added to 225 g of silica and the mixture was stirred to prepare a dispersion. 6.75 g of an antioxidant was added, then, while stirring, a mixture of 55.6 g of a styrene-butadiene-vinyl pyridine copolymer latex (Nipol 2518FS) (22.5 g worth of rubber) and 1723.5 g of styrene-butadiene copolymer latex (Nipol 1502) (427.5 g worth of rubber) was slowly added dropwise, then the mixture was stirred at room temperature for 5 hours. Next, 10 g of sodium chloride was added and the mixture was stirred to cause the composite of rubber and silica to precipitate. This composite was sucked up and squeezed dried, then lightly washed with water and again squeezed dried, then dried at 120° C. in vacuo to obtain the composite.

6) Synthesis of Composite 17

750 ethyl(meth)acrylate, ml of water was added to 225 g of silica and the mixture was stirred to prepare a dispersion. 6.75 g of an antioxidant was added, then, while stirring, 45 g of a styrene-butadiene-(meth)acrylate copolymer latex (Nipol LX426) (100 g worth of rubber) was slowly added dropwise, then the mixture was stirred at room temperature for 3 hours. Next, 1723.5 g of styrene-butadiene copolymer latex (Nipol 1502) (427.5 g worth of rubber) was slowly added dropwise, then the mixture was stirred for 5 hours. Next, 10 g of sodium chloride was added and the mixture was stirred to cause the composite of rubber and silica to precipitate. This composite was sucked up and squeezed dried, then lightly washed with water and again squeezed dried, then dried at 120° C. in vacuo to obtain the composite.

7) Synthesis of Composite 21

15 g of a silane coupling agent (Si-69) was added under stirring to 500 g of colloidal silica (150 g worth of silica) and the mixture was stirred at 80° C. for 1.5 hours. 5 of an antioxidant was added, then a mixture of 30.0 g of a styrene-butadiene-(meth)acrylate copolymer latex (Nipol LX426) (15 g worth of rubber) and 1149 g of styrene-butadiene copolymer latex (Nipol 1502) (285 g worth of rubber) was slowly added dropwise, then the mixture was stirred for 1.5 hours. Next, 10 g of sodium chloride was added and the mixture was stirred to cause the composite of rubber and silica to precipitate. This composite was sucked up and squeezed dried, then lightly washed with water and again squeezed dried, then dried at 120° C. in vacuo to obtain the composite.

8) Synthesis of Composites 12 to 15 and 18 to 20

Composites 12 to 15 and 18 to 20 were synthesized based on the methods of synthesis of the above Composites 16 to 17 and 21 in accordance with the ingredients and reaction conditions shown in the following Tables 2A and 2B. The above results are shown in Tables 2A and 2B.

TABLE 2A

Synthesis Examples

| | Composite | | | | |
|---|---|---|---|---|---|
| | 12 | 13 | 14 | 15 | 16 |
| Silica*6 | 300 g | 300 g | 225 g | 225 g | 225 g |
| Colloidal silica*7 | | | | | |
| Water | 1 liter | 1 liter | 750 ml | 750 ml | 750 ml |
| SBVP copolymer latex (amount of rubber)*2 | 74 g (30 g) | | 55.6 g (22.5 g) | 55.6 g (22.5 g) | |
| SBAC copolymer latex (amount of rubber)*8 | | | | | |
| NBR latex (amount of rubber)*4 | | 300 g (150 g) | | | |
| SB copolymer latex (amount of rubber)*3 | 2299 g (570 g) | | 1723.5 g (427.5 g) | 1723.5 g (427.5 g) | |
| SBVP copolymer + SB copolymer latex | | | | | 55.6 + 1723.5 g |
| SBAC copolymer + SB copolymer latex | | | | | |
| Emulsifier*9 | | | | | |
| Aromatic oil*10 | | | 45 g | | |
| Antioxidant*11 | | | 6.75 g | 6.75 g | 6.75 g |
| Silane coupling agent*12 | | | | 22.5 g | |
| Reaction temperature | Room temp. | 80° C. | 80° C. | 80° C. | Room temp. |
| 1st-step reaction time | 5 hours | 5 hours | 3 hours | 3 hours | 5 hours |
| 2nd-step reaction time | 5 hours | | 5 hours | 5 hours | |
| State of composite | Produced | Separated | Produced | Produced | Produced |

Notes)*2: Styrene-butadiene-vinyl pyridine copolymer latex: Nipol 2518FS (made by Nippon Zeon)
*3Styrene-butadiene copolymer latex: Nipol 1502 (made by Nippon Zeon)
*4Acrylonitrile-butadiene copolymer latex: Nipol 1561 (made by Nippon Zeon)
*6Silica: Nipsil LP (made by Nihon Silica)
*7Colloidal silica: ST-30 (made by Nissan Chemical)
*8Styrene-butadiene-(meth)acrylate copolymer latex: Nipol LX426 (made by Nippon Zeon)
*9Emulsifier: Emulgen 104P (made by Kao Soap)
*10Aromatic oil: Desolex No. 3 (made by Showa Shell)
*11Antioxidant: Irganox 1520 (made by Ciba Speciality Chemical)
*12Silane coupling agent: Si69 (made by Degussa)

TABLE 2B

Synthesis Examples

| | Composite | | | | |
|---|---|---|---|---|---|
| | 17 | 18 | 19 | 20 | 21 |
| Silica*6 | 225 g | 150 g | | | |
| Colloidal silica (amount of silica)*7 | | | 500 g (150 g) | 500 g (150 g) | 500 g (150 g) |
| Water | 750 ml | 500 ml | | | |
| SBVP copolymer latex (amount of rubber)*2 | | | | | |
| SBAC copolymer latex (amount of rubber)*8 | 45 g (22.5 g) | | | | |

TABLE 2B-continued

Synthesis Examples

| | Composite | | | | |
|---|---|---|---|---|---|
| | 17 | 18 | 19 | 20 | 21 |
| NBR latex (amount of rubber)*4 | | | | | |
| SB copolymer latex (amount of rubber)*3 | 1723.5 g (427.5 g) | | | | |
| SBVP copolymer + SB copolymer latex | | 37.04 + 1149 g | 37.04 + 1149 g | 37.04 + 1149 g | |
| SBAC copolymer + SB copolymer latex | | | | | 30.0 + 1149 g |
| Emulsifier*9 | | 15 g | | | |
| Aromatic oil*10 | | | | | |
| Antioxidant*11 | 6.75 g | 5 g | 5 g | 5 g | 5 g |
| Silane coupling agent*12 | | 15 g | 15 g | | 15 g |
| Reaction temperature | Room temp. | 80° C. | 80° C. | 80° C. | 80° C. |
| 1st-step reaction time | 3 hours | 1.5 hours | 1.5 hours | 1.5 hours | 1.5 hours |
| 2nd-step reaction time | 5 hours | | | | |
| State of composite | Produced | Produced | Produced | Produced | Produced |

Notes)*2Styrene-butadiene-vinyl pyridine copolymer latex: Nipol 2518FS (made by Nippon Zeon)
*3Styrene-butadiene copolymer latex: Nipol 1502 (made#by Nippon Zeon)
*4Acrylonitrile-butadiene copolymer latex: Nipol 1561 (made by Nippon Zeon)
*6Silica: Nipsil LP (made by Nihon Silica)
*7Colloidal silica: ST-30 (made by Nissan Chemical)
*8Styrene-butadiene-(meth)acrylate copolymer latex: Nipol LX426 (made by Nippon Zeon)
*9Emulsifier: Emulgen 104P (made by Kao Soap)
*10Aromatic oil: Desolex No. 3 (made by Showa Shell)
*11Antioxidant: Irganox 1520 (made by Ciba Speciality Chemical)
*12Silane coupling agent: Si69 (made by Degussa)

From the results of Tables 2A and 2B, it is learned that if the amount of the styrene-butadiene-(meth)acrylate copolymer latex is more than 0.1 wt % based on the silica in terms of rubber (Synthesis Examples 17 and 21), a composite is produced. Further, it is learned that if an emulsifier and/or silane coupling agent is added to the reaction system in the synthesis of the silica polymer, composite of the present invention (Synthesis Examples 18, 19, and 21), the reaction time is shortened and the predetermined composite can be effectively obtained. Further, it was learned that the reaction time can be shortened more if the reaction temperature is raised.

The Composites 1 and 2 obtained above were used to obtain rubber compositions of the formulations shown in the following Table 3. These were tested for their viscosities and dispersabilities.

Preparation of Samples

The ingredients other than the vulcanization accelerator and sulfur were kneaded in a 1.8 liter capacity internal mixer for 3 to 5 minutes. The mixture was discharged when reaching 165±5° C. The vulcanization accelerator and sulfur were kneaded with this master batch by an 8 inch open roll to obtain the rubber composition. The unvulcanized property "Mooney viscosity" of the obtained rubber composition was then measured.

Next, the composition was vulcanized by pressing in a 15×15×0.2 cm mold at 160° C. for 20 minutes to prepare a test,.piece (rubber sheet), which was used for measurement of the "dispersibility".

The methods of measuring the Mooney viscosity and dispersibility of the rubber compositions obtained in the Examples were as follows:

1) Mooney viscosity: Measured based on JIS K 6300 at 100° C.

2) Dispersibility: The state of dispersion was observed by an optical microscope. "Excellent" indicates uniform, "Good" approximately uniform, and "Poor" nonuniform dispersion.

Examples 1 to 4 and Comparative Examples 1 to 2

The formulations and results of the Examples are shown in the following Table 3.

TABLE 3

| | Rubber Composition | | | | | |
|---|---|---|---|---|---|---|
| | Comp. Ex. 1 | Comp. Ex. 2 | Ex. 1 | Ex. 2 | Ex. 3 | Ex. 4 |
| SBR*1 | 100.00 | 100.00 | 82.15 | 82.15 | 92.85 | 92.85 |
| Silica*2 | 50.00 | 50.00 | | | | |
| Composite 1*3 | | | 67.86 | 67.86 | | |
| Composite 2*4 | | | | | 57.16 | 57.16 |

TABLE 3-continued

| | Rubber Composition | | | | | |
|---|---|---|---|---|---|---|
| | Comp. Ex. 1 | Comp. Ex. 2 | Ex. 1 | Ex. 2 | Ex. 3 | Ex. 4 |
| Si69*5 | | 5.00 | | 5.00 | | 5.00 |
| DEG*6 | 2.50 | 2.50 | 2.50 | 2.50 | 2.50 | 2.50 |
| Zinc white*7 | 3.00 | 3.00 | 3.00 | 3.00 | 3.00 | 3.00 |
| Stearic acid*8 | 1.00 | 1.00 | 1.00 | 1.00 | 1.00 | 1.00 |
| Antioxidant 6C*9 | 1.00 | 1.00 | 1.00 | 1.00 | 1.00 | 1.00 |
| Powdered sulfur*10 | 1.70 | 1.70 | 1.70 | 1.70 | 1.70 | 1.70 |
| Vulcanization accelerator DPG*11 | 0.30 | 0.30 | 0.30 | 0.30 | 0.30 | 0.30 |
| Vulcanization accelerator CZ*12 | 1.00 | 1.00 | 1.00 | 1.00 | 1.00 | 1.00 |
| Total weight (parts by weight) | 166.50 | 165.50 | 160.51 | 165.51 | 160.51 | 165.51 |
| Mooney viscosity | 100.00 | 40.00 | 40.00 | 33.00 | 29.00 | 24.00 |
| Dispersibility | Poor | Excellent | Excellent | Good | Excellent | Excellent |

Notes)*1SBR: Nipol 1502 (made by Nippon Zeon)
*2Silica: Nipsil(made by Nihon Silica)
*3Composite 1: Composite of Synthesis Example 1
*4Composite 2: Composite of Synthesis Example 2
*5Silane coupling agent: Si69 (bis(3-[triethoxysilyl)-propyl]tetrasulfide) (made by Degussa)
*6Diethylene glycol: DEG
*7Zinc white: Zinc White No. 3 (made by Seido Chemical)
*8Stearic acid: Lunac YA (made by Kao Soap)
*9Antioxidant 6C: Antigen 6C (N-phenyl-N'-(1,3-dimethyl)-p-phenylene diamine) (made by Sumitomo Chemical)
*10Powdered sulfur: Insoluble sulfur
*11Vulcanization accelerator DPG: Vulkacit D (diphenyl guanidine) (made by Bayer)
*12Vulcanization accelerator CZ: Noccelar CZ. (N-cyclohexyl-2-benzothiazyl sulfenamide) (made by Ouchi Shinko Chemical)

From the results of Table 3, it is learned that each of the rubber compositions of Examples 1 to 4 using the silica-polymer,composite of the present invention had a low Mooney viscosity and superior dispersibility.

The Composites 14 to 21 obtained above were used to obtain rubber compositions of the formulations shown in the following Tables 4A and 4B. These were tested for their dispersabilities and tensile strengths.

Preparation of Samples

The ingredients other than the vulcanization accelerator and sulfur were kneaded in a 1.8 liter capacity internal mixer for 3 to 5 minutes. The mixture was discharged when reaching 165±5° C. The vulcanization accelerator and sulfur were kneaded with this master batch by an 8 inch open roll to obtain the rubber composition. Next, the rubber composition was vulcanized by pressing in a 15×15×0.2 cm mold at 160° C. for 20 minutes to prepare attest piece (rubber sheet), which was used for measurement of the "dispersibility" and "tensile strength".

The methods of measuring the "dispersibility" and "tensile strength" of the rubber compositions obtained in the Examples were as follows:

1) Dispersibility: The vulcanized rubber was cut by a sharp knife, then the surface was observed visually and through an optical microscope (100×, 400×) to confirm the state of dispersion of the silica. This was evaluated by the following method:

Excellent . . . The silica was uniformly dispersed with almost no clumps of poorly dispersed silica (several 100 μm in size).

Good . . . Several clumps of poorly dispersed silica were found, but otherwise the silica was dispersed to a certain extent.

Fair . . . Several dozen clumps of poorly dispersed silica were found, but otherwise the silica was dispersed to a certain extent.

Poor . . . It could be confirmed that a powdery substance was visible on the cut surface and countless clumps of poorly dispersed silica were seen.

2) Tensile Test: JIS K6251 dumbbell shaped no. 3 samples were used and the tensile breaking energy (MPa) was found from the area of the stress-elongation curve until breaking.

Examples 5 to 16 and Comparative Example 3

The formulations and results of the Examples are shown in the following Tables 4A and 4B.

TABLE 4A

| | Rubber Composition | | | | | | |
|---|---|---|---|---|---|---|---|
| | Comp. Ex. 3 | Ex. 5 | Ex. 6 | Ex. 7 | Ex. 8 | Ex. 9 | Ex. 10 |
| SBR*1 | 100.00 | 12.42 | | | | 8.37 | |
| Composite 14*2 | | 138.89 | | | | | |
| Composite 15*3 | | | 156.50 | 156.50 | 156.50 | | |
| Composite 16*4 | | | | | | | 143.00 |

TABLE 4A-continued

| | Rubber Composition | | | | | | |
|---|---|---|---|---|---|---|---|
| | Comp. Ex. 3 | Ex. 5 | Ex. 6 | Ex. 7 | Ex. 8 | Ex. 9 | Ex. 10 |
| Composite 17*5 | | | | | | | 142.89 |
| Silica*6 | 50.00 | | | | | | |
| Si69*8 | 5.00 | 5.00 | | 1.00 | 5.00 | 5.00 | 5.00 |
| DEG*8 | 6.00 | 6.00 | 6.00 | 6.00 | 6.00 | 6.00 | 6.00 |
| Zinc white*9 | 3.00 | 3.00 | 3.00 | 3.00 | 3.00 | 3.00 | 3.00 |
| Stearic acid*10 | 1.00 | 1.00 | 1.00 | 1.00 | 1.00 | 1.00 | 1.00 |
| Antioxidant 6C*11 | 1.00 | 1.00 | 1.00 | 1.00 | 1.00 | 1.00 | 1.00 |
| Sulfur*12 | 1.40 | 1.40 | 1.40 | 1.40 | 1.40 | 1.40 | 1.40 |
| Vulcanization accelerator DT*13 | 2.00 | 2.00 | 2.00 | 2.00 | 2.00 | 2.00 | 2.00 |
| Vulcanization accelerator CZ*14 | 1.70 | 1.70 | 1.70 | 1.70 | 1.70 | 1.70 | 1.70 |
| Total weight (parts by weight) | 171.10 | 172.41 | 172.60 | 173.60 | 177.60 | 172.47 | 172.6 |
| Dispersibility | Fair | Good | Good | Good | Good | Excellent | Good |
| Tensile strength (MPa) | 18.1 | 19.0 | 19.7 | 20.7 | 20.3 | 19.7 | 18.8 |

Notes)
1: SBR: Nipol 1502 (made by Nippon Zeon)
*2: Composite 14: Composite of Synthesis Example 14
*3: Composite 15: Composite of Synthesis Example 15
*4: Composite 16: Composite of Synthesis Example 16
*5: Composite 17: Composite of Synthesis Example 17
*6: Silica: Nipsil (made by Nihon Silica)
*7: Silane coupling agent: Si69 (bis[3-(triethoxysilyl)-propyl]tetrasulfide) (made by Degussa)
*8: Diethylene glycol: DEG
*9: Zinc white: Zinc White No. 3 (made by Seido Chemical)
*10: Stearic acid: Lunac YA (made by Kao Soap)
*11: Antioxidant 6C: Antigen 6C (N-phenyl-N'-(1,3-dimethyl)-p-phenylene diamine) (made by Sumitomo Chemical)
*12: Powdered sulfur: Insoluble sulfur
*13: Vulcanization accelerator DT: Noccelar DT (di-o-tolylguanidine) (made by Ouchi Shinko Chemical)
*14: Vulcanization accelerator CZ: Noccelar CZ (N-cyclohexyl-2-benzothiazyl sulfenamide) (made by Ouchi Shinko Chemical)

TABLE 4B

| | Rubber Composition | | | | | |
|---|---|---|---|---|---|---|
| | Ex. 11 | Ex. 12 | Ex. 13 | Ex. 14 | Ex. 15 | Ex. 16 |
| SBR*1 | | | | | | |
| Composite 14*2 | 155.72 | 155.72 | | | | |
| Composite 15*3 | | | 148.39 | | | |
| Composite 16*4 | | | | 114.89 | 114.89 | |
| Composite 17*5 | | | | | | 114.18 |
| Silica*6 | | | 6.61 | | | |
| Si69*8 | | 2.00 | 5.00 | | 2.00 | |
| DEG*8 | 6.00 | 6.00 | 6.00 | 6.00 | 6.00 | 6.00 |
| Zinc white*9 | 3.00 | 3.00 | 3.00 | 3.00 | 3.00 | 3.00 |
| Stearic acid*10 | 1.00 | 1.00 | 1.00 | 1.00 | 1.00 | 1.00 |
| Antioxidant 6C*11 | 1.00 | 1.00 | 1.00 | 1.00 | 1.00 | 1.00 |
| Sulfur*12 | 1.40 | 1.40 | 1.40 | 1.40 | 1.40 | 1.40 |
| Vulcanization accelerator DT*13 | 2.00 | 2.00 | 2.00 | 2.00 | 2.00 | 2.00 |
| Vulcanization accelerator CZ*14 | 1.70 | 1.70 | 1.70 | 1.70 | 1.70 | 1.70 |
| Total weight (parts by weight) | 171.82 | 173.82 | 176.10 | 169.19 | 171.19 | 169.16 |
| Dispersibility | Excellent | Excellent | Good | Good | Good | Good |
| Tensile strength (MPa) | 21.4 | 21.5 | 19.6 | 20.2 | 20.6 | 20.3 |

Notes)
1: SBR: Nipol 1502 (made by Nippon Zeon)
*2: Composite 18: Composite of Synthesis Example 18
*3: Composite 19: Composite of Synthesis Example 19
*4: Composite 20: Composite of Synthesis Example 20
*5: Composite 21: Composite of Synthesis Example 21
*6: Silica: Nipsil (made by Nihon Silica)
*7: Silane coupling agent: Si69 (bis[3-(triethoxysilyl)-propyl]tetrasulfide) (made by Degussa)
*8: Diethylene glycol: DEG
*9: Zinc white: Zinc White No. 3 (made by Seido Chemical)
*10: Stearic acid: Lunac YA (made by Kao Soap)
*11: Antioxidant 6C: Antigen 6C (N-phenyl-N'-(1,3-dimethyl)-p-phenylene diamine) (made by Sumitomo Chemical)
*12: Sulfur: Powdered sulfur
*13: Vulcanization accelerator DT: Noccelar DT (di-o-tolylguanidine) (made by Ouchi Shinko Chemical)
*14: Vulcanization accelerator CZ: Noccelar CZ (N-cyclohexyl-2-benzothiazyl sulfenamide) (made by Ouchi Shinko Chemical)

From the results of Tables 4A and 4B, it is learned that each of the rubber compositions of Examples 5 to 16 using the silica-polymer composite of the present invention were superior in dispersibility and superior in tensile strength. In particular, in the rubber compositions using the silica-polymer composite of the present invention plus an emulsifier (Examples 11 and 12), the dispersibility and tensile strength were both much more superior.

Summarizing the effects of the invention, the silica polymer composite obtained by the present invention gives a composite free from separation of the silica and rubber and, when kneaded with a rubber, features a low viscosity during kneading, is excellent in processability, and is superior in both dispersibility and tensile strength. Therefore, if making silica this composite and using it as a filler for a rubber, it is possible to knead it in extremely easily and uniformly without causing the various problems in the silica of the related art and, further, the processability during the kneading is excellent. The silica-polymer composite is therefore extremely useful.

What we claim is:

1. A silica-polymer composite obtained by reacting a polymer having a polar group containing a hetero atom and a benzene ring in a molecule with silica in a solution.

2. A silica-polymer composite obtained by reacting a polymer having at least one group selected from the group consisting of an amino group and a nitrogen-containing heterocyclic group, and a benzene ring in a molecule with silica in a solution.

3. A silica-polymer composite obtained by reacting a polymer having a pyridine ring and a benzene ring in a molecule with silica in a solution.

4. A silica-polymer composite as set forth in claim 3 wherein the silica is treated with the polymer having the pyridine ring and the benzene ring in the molecule and then treated by another polymer solution.

5. A silica-polymer composite as set forth in claim 3 wherein the polymer having the pyridine ring and the benzene ring in the molecule is added in an amount to give at least 0.1 wt % of pyridine ring units to silica.

6. A method of producing a silica-polymer composite comprising reacting, in the absence of any necessary lowering or raising of pH, a polymer having a polar group containing a hetero atom and a benzene ring in a molecule with silica in a solution.

7. A method of producing a silica-polymer composite comprising reacting, in the absence of any necessary lowering or raising of pH, a polymer having at least one group selected from the group consisting of an amino group and a nitrogen- containing heterocyclic group, and a benzene ring in a molecule with silica in a solution.

8. A method of producing a silica-polymer composite comprising reacting, in the absence of any necessary lowering or raising of pH, a polymer having a pyridine ring and benzene ring in a molecule with silica in a solution.

9. A method of producing a silica-polymer composite as set forth in claim 8 comprising treating the silica with the polymer having the pyridine ring and the benzene ring in the molecule and then treating it by another polymer solution.

10. A silica-polymer composite as set forth in claim 1, wherein the polymer having the polar group containing a hetero atom and the benzene ring is an elastomer.

11. A method of producing a silica-polymer composite as set forth in claim 10, comprising reacting the elastomer having the polar group containing a hetero atom and the benzene ring with silica.

12. A method of producing a silica-polymer composite as set forth in claim 6, further comprising adding an emulsifier to conduct said reaction.

13. A rubber composition containing a silica-polymer composite as set forth in claim 1.

\* \* \* \* \*